US009963818B2

(12) United States Patent
Nakamoto

(10) Patent No.: US 9,963,818 B2
(45) Date of Patent: May 8, 2018

(54) DRUM WASHING MACHINE

(71) Applicants: HAIER ASIA CO., LTD., Tokyo (JP); QINGDAO HAIER WASHING MACHINE CO., LTD., Shandong (CN)

(72) Inventor: Shigeharu Nakamoto, Tokyo (JP)

(73) Assignees: Haier Asia Co., Ltd., Tokyo (JP); Qingdao Haier Washing Machine Co., Ltd., Shandong (CN)

( * ) Notice: Subject to any disclaimer, the term of this patent is extended or adjusted under 35 U.S.C. 154(b) by 0 days. days.

(21) Appl. No.: 15/501,802

(22) PCT Filed: Aug. 5, 2015

(86) PCT No.: PCT/CN2015/086187
§ 371 (c)(1),
(2) Date: Feb. 3, 2017

(87) PCT Pub. No.: WO2016/019878
PCT Pub. Date: Feb. 11, 2016

(65) Prior Publication Data
US 2017/0241065 A1 Aug. 24, 2017

(30) Foreign Application Priority Data
Aug. 5, 2014 (JP) .............................. 2014-159928

(51) Int. Cl.
*D06F 23/02* (2006.01)
*D06F 23/06* (2006.01)
(Continued)

(52) U.S. Cl.
CPC .............. *D06F 37/40* (2013.01); *D06F 23/02* (2013.01); *D06F 23/06* (2013.01); *D06F 33/02* (2013.01);
(Continued)

(58) Field of Classification Search
CPC .......... D06F 23/02; D06F 23/06; D06F 33/02; D06F 37/304; D06F 37/40; D06F 39/005; D06F 39/083; D06F 39/087; D06F 39/088
(Continued)

(56) References Cited

U.S. PATENT DOCUMENTS

| 2011/0061171 | A1 | 3/2011 | Kim et al. | |
| 2013/0111676 | A1* | 5/2013 | Jun | H02K 21/12 |
| | | | | 8/137 |

FOREIGN PATENT DOCUMENTS

| CN | 2576758 Y | 10/2003 |
| CN | 1453416 A | 11/2003 |

(Continued)

OTHER PUBLICATIONS

International Search Report dated Nov. 11, 2015 from International Patent Application No. PCT/CN2015/086185, filed Aug. 5, 2015.
(Continued)

*Primary Examiner* — Levon J Shahinian
(74) *Attorney, Agent, or Firm* — Sunstone IP

(57) ABSTRACT

A drum washing machine capable of performing washing applicable to various washings is provided. The drum washing machine includes: an outer tank provided in a shell; a drum, which is provided in the outer tank and configured to rotate with a horizontal shaft or an inclination shaft inclining relative to a horizontal direction as a center; a driving part, configured to be operated in a first and second driving form, the first driving form refers to a form in which the drum and a rotating body are enabled to rotate at different rotation speeds, the second driving form refers to a form in which the drum and the rotating body are enabled to rotate integrally at a same rotation speed; a control part, configured to control actions of the driving part.

15 Claims, 10 Drawing Sheets

(51) Int. Cl.
  *D06F 33/02* (2006.01)
  *D06F 37/30* (2006.01)
  *D06F 37/40* (2006.01)
  *D06F 39/00* (2006.01)
  *D06F 39/08* (2006.01)

(52) U.S. Cl.
  CPC .......... *D06F 37/304* (2013.01); *D06F 39/005* (2013.01); *D06F 39/083* (2013.01); *D06F 39/087* (2013.01); *D06F 39/088* (2013.01)

(58) Field of Classification Search
  USPC ............................................ 68/24, 131, 140
  See application file for complete search history.

(56) References Cited

FOREIGN PATENT DOCUMENTS

| CN | 1888197 A | 1/2007 |
|----|-----------|--------|
| CN | 1888202 A | 1/2007 |
| CN | 104032542 A | 9/2014 |
| CN | 203890713 U | 10/2014 |
| CN | 203890716 U | 10/2014 |
| JP | 3280992 A | 12/1991 |
| JP | 2008104684 A | 5/2008 |
| KR | 950007852 B1 | 7/1995 |
| KR | 20050087342 A | 8/2005 |
| WO | 2013062314 A1 | 5/2013 |

OTHER PUBLICATIONS

International Search Report dated Nov. 12, 2015 from International Patent Application No. PCT/CN2015/086174, filed Aug. 5, 2015.
International Search Report dated Nov. 17, 2015 from International Patent Application No. PCT/CN2015/086187, filed Aug. 5, 2015.
European Search Report dated Dec. 1, 2017 from International Patent Application No. PCT/CN2015/086187, filed Aug. 5, 2015.

* cited by examiner

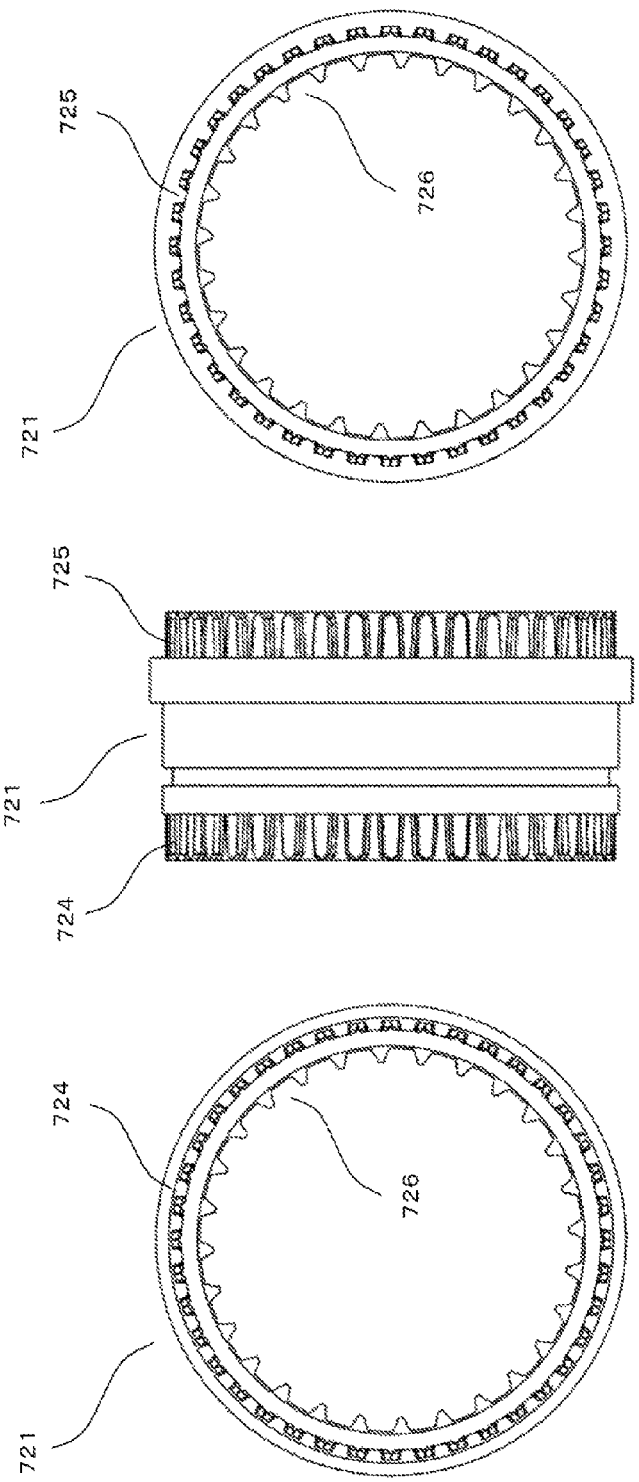

DRUM WASHING MACHINE

CROSS REFERENCE TO RELATED APPLICATION(S)

This application is a U.S. National Stage Entry of International Patent Application No. PCT/CN2015/086187, filed Aug. 5, 2015, which claims the benefit of Japanese Patent Application No. JP 2014-159928, filed Aug. 5, 2014, the disclosures of which are hereby incorporated entirely herein by reference.

BACKGROUND

Technical Field

The present disclosure relates to a drum washing machine, which not only can continuously operate from washing to drying, but also can carry out washing without drying.

State of the Art

In the past, washing is realized by the drum washing machine in the following manner: enabling a transverse-shaft type drum to rotate in an outer tank which stores water at the bottom, lifting and dropping washings by baffles arranged in the drum, and throwing the washings to an inner circumferential surface of the drum.

In this way, in a structure of stirring the washings by the baffles, the washings are difficult to twine or rub against each other. Therefore, compared with an automatic washing machine which washes the washings through rotation of a pulsator in a washing and dewatering tank, the drum washing machine has a smaller mechanical force acted on the washings and a reduced detergency.

Therefore, in order to improve the detergency, a structure that a rotating body, on the surface of which there exists a protruding part, is arranged at a rear part of the drum and the drum and the stirring body rotate at different rotation speeds during washing and rinsing can be adopted for the drum washing machine (with reference to patent literature 1).

RELEVANT LITERATURE

Patent Literature

Patent Literature 1: Japanese Patent application Laid-Open No. 03-280992

SUMMARY

Problem to be Solved by the Disclosure

One type of washings includes clothes with poor resistance to mechanical force, such as delicate clothes, clothes with drying marks and the like. The operation of enabling the drum and the stirring body to rotate at different rotation speeds not only gives the mechanical force generated by rotation of the drum to the washings, but also gives the mechanical force generated by contacting with the rotating body to the washings, so such operation is not suitable for washing the clothes with poor resistance to mechanical force.

The present disclosure is completed in view of the problem, and aims to provide a drum washing machine capable of performing washing suitable for various washings.

Solution for Solving the Problem

A drum washing machine in a main manner in the disclosure includes: an outer tank provided in a shell; a drum, which is provided in the outer tank and configured to rotate with a horizontal shaft or an inclination shaft inclining relative to a horizontal direction as a center; a rotating body, provided at a rear part of the drum and a surface of which is provided with a protruding part in contact with washings; a driving part, configured to be operated in a first driving form and a second driving form, wherein the first driving form refers to a form in which the drum and the rotating body are enabled to rotate at different rotation speeds, and the second driving form refers to a form in which the drum and the rotating body are enabled to rotate integrally at a same rotation speed; and a control part, configured to control actions of the driving part. Herein, in a washing process or a rinsing process, the control part is configured to control the driving part to be operated in the first driving form or the second driving form in accordance with a corresponding washing mode.

According to the above structure, various washings can be well washed since the washing can be performed in a driving form suitable for the type of the washings.

The washing mode includes a delicate mode for washing clothes with poor resistance to mechanical force in the drum washing machine of the present embodiment. In this case, the control part is configured to control the driving part to be operated in the second driving form when the delicate mode is performed.

According to the above structure, the driving part is enabled to be operated in the second driving form in a washing process or a rinsing process of the delicate mode. In the second driving form, the mechanical force generated by rotation of the drum is applied to the washings, while the mechanical force generated by the rotating body is not applied. As a result, the clothes with worries about cloth damage and poor resistance to mechanical force can be washed gently.

In the drum washing machine of the present embodiment, a structure which enables the driving part to be operated in a third driving form can be adopted. The third driving form refers to a form in which the drum is enabled to rotate while the rotating body is enabled to be in a free rotation state. In this case, in the washing process or the rinsing process, the control part switches the driving forms in accordance with the corresponding washing mode, so that the driving part is operated in the first driving form, the second driving form or the third driving form.

According to the above structure, the control part not only can switch to the first driving form and the second driving form, but also can switch to the third driving form in accordance with the corresponding washing mode, thereby better washing various washings.

The washing mode may include a delicate mode for washing the clothes with poor resistance to mechanical force in the case of adopting the above structure. In this case, the control part is configured to control the driving part to be operated in the third driving form when the delicate mode is performed.

In the case of adopting the above structure, the driving part is operated in the third driving form in the washing process or the rinsing process of the delicate mode. In the third driving form, the washings on the rear part of the drum have a good movement direction due to free rotation of the rotating body, so as to prevent the washings from twining caused by a rotation difference of washings on a front side and a rear side of the drum, and to wash the clothes with poor resistance to mechanical force in a state with cloth damage less than that of the second driving form.

The washing mode may include a bedding mode for washing beddings in the drum washing machine of the present embodiment. In this case, the control part is configured to control the driving part to be operated in the second driving form when the bedding mode is performed.

According to the above structure, the driving part is operated in the second driving form in the washing process or the rinsing process of the bedding mode. The mechanical force generated by rotation of the drum is applied to the washings, while the mechanical force generated by the rotating body is not applied in the second driving form. As a result, the clothes with worries about cloth damage can be washed gently.

In the drum washing machine of the present embodiment, the washing mode may include a standard mode for common washing. In this case, the control part is configured to control the driving part to be operated in the first driving form when the standard mode is performed.

According to the above structure, the driving part is operated in the first driving form in the washing process or the rinsing process of the standard mode. In the first driving form, the mechanical force generated by the drum is applied to the washings, and the mechanical force generated by the rotating body is also applied. As a result, the clothes with fewer worries about cloth damage can be hard washed.

Effects of the Disclosure

A drum washing machine capable of performing washing suitable for various washings can be provided according to the present disclosure.

The effects and significance of the present disclosure can be further clarified by description of the embodiments shown below. However, the following embodiments are merely an example when the present disclosure is implemented, and the present disclosure is not limited by a technical solution of any of the following embodiments.

BRIEF DESCRIPTION OF DRAWINGS

FIG. 6*a* is a diagram illustrating a structure of a clutch part constituting the clutch body according to embodiments.

FIG. 6*b* is a diagram illustrating a structure of a clutch part constituting the clutch body according to embodiments.

FIG. 6*c* is a diagram illustrating a structure of a clutch part constituting the clutch body according to embodiments.

DETAILED DESCRIPTION

An embodiment of a drum washing machine according to the present disclosure, i.e., a drum washing machine with a drying function, is described below with reference to the drawings.

Figure 1:
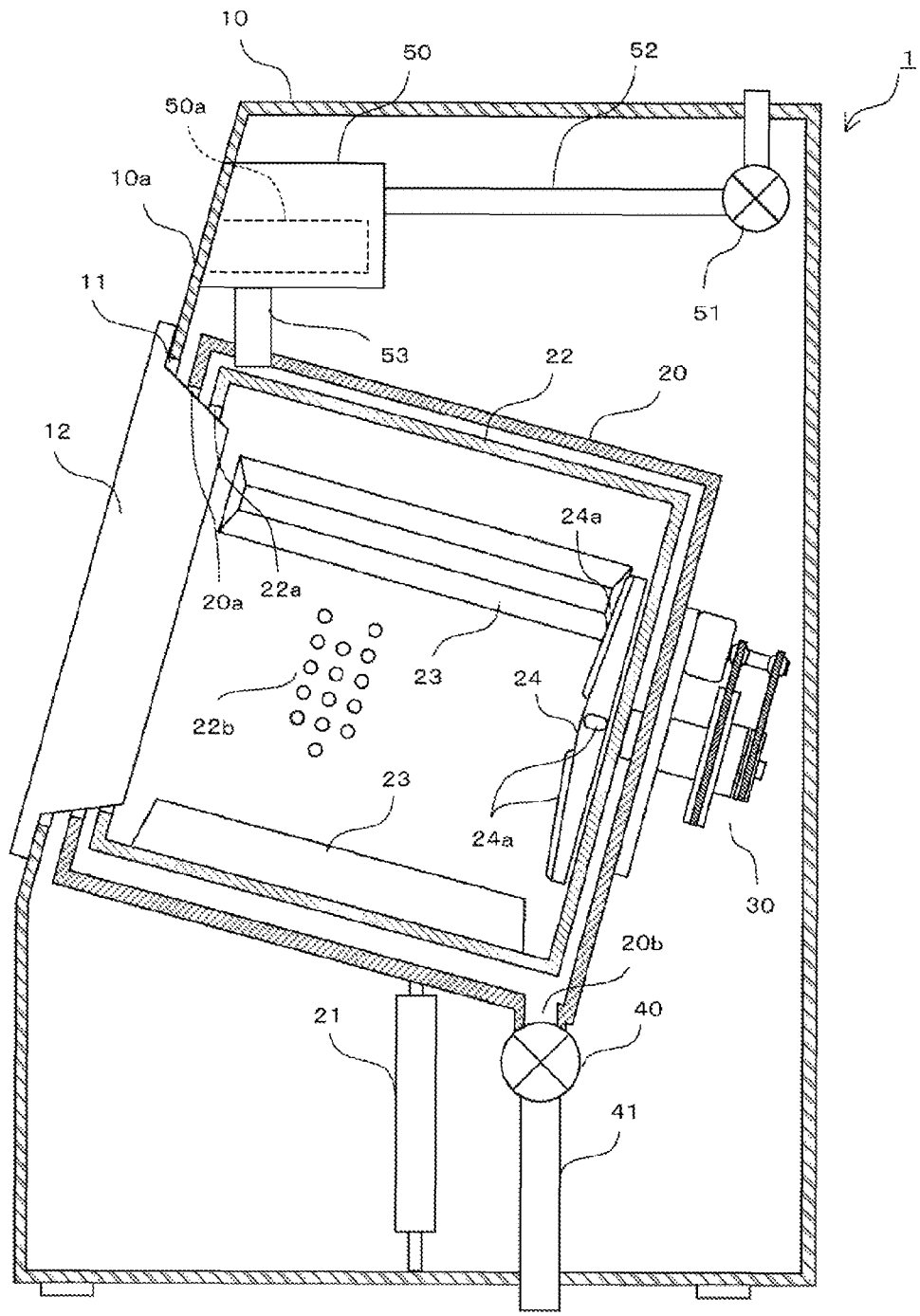
FIG. 1 is a side sectional view illustrating a structure of a drum washing machine according to embodiments.

FIG. 1 is a side sectional view illustrating a structure of a drum washing machine 1.

The drum washing machine 1 includes a shell 10 constituting an appearance. A front surface 10*a* of the shell 10 is upswept from a central part, and a throwing inlet 11 for washings is formed on the inclined surface. The throwing inlet 11 is covered by a freely opened and closed door 12.

In the shell 10, an outer tank 20 is elastically supported by a plurality of shock absorbers 21. A drum 22 is provided in the outer tank 20 in a free rotation manner. The outer tank 20 and the drum 22 are inclined in a manner that rear surface sides become lower relative to a horizontal direction. As a result, the drum 22 rotates around an inclination shaft inclining relative to the horizontal direction. Inclination angles of the outer tank 20 and the drum 22 are set to be about 10-20 degrees. An opening part 20*a* on a front surface of the outer tank 20 and an opening part 22*a* of a front surface of the drum 22 are opposite to the throwing inlet 11, and are closed together with the throwing inlet 11 by the door 12. A plurality of dewatering holes 22*b* are formed on an inner circumferential surface of the drum 22. Further, three baffles 23 are arranged on the inner circumferential surface of the drum 22 at roughly equal intervals in a circumferential direction.

A stirring body 24 is provided at a rear part of the drum 22 in a free rotation manner. The stirring body 24 is of a roughly disc shape. A plurality of blades 24*a* radially extending from a central part are formed on the surface of the stirring body 24. The stirring body 24 rotates coaxially with the drum 22.

A driving unit 30 for generating torques for driving the drum 22 and the stirring body 24 is provided behind the outer tank 20. The driving unit 30 is equivalent to a driving part of the present disclosure. The driving unit 30 enables the drum 22 and the stirring body 24 to rotate at different rotation speeds in the same direction during a washing process and a rinsing process.

Specifically, the driving unit 30 enables the drum 22 to rotate at a rotation speed when a centrifugal force applied to washings in the drum 22 is smaller than a gravity force, and enables the stirring body 24 to rotate at a rotation speed greater than the rotation speed of the drum 22.

On the other hand, the driving unit 30 enables the drum 22 and the stirring body 24 to rotate integrally at a rotation speed when the centrifugal force applied to the washings in the drum 22 is far greater than the gravity force. A detailed structure of the driving unit 30 is described later.

A drainage exit part 20*b* is formed at the bottom of the outer tank 20. A drainage valve 40 is arranged in the drainage exit part 20*b*. The drainage valve 40 is connected with a drainage hose 41. Water stored in the outer tank 20 is drained outside the machine through the drainage hose 41 when the drainage valve 40 is opened.

A detergent box 50 is provided on a front upper part of the shell 10. A detergent container 50a for accommodating a detergent is accommodated in the detergent box 50 in such a manner that the detergent container 50a may be freely drawn out from the front. The detergent box 50 is connected with a water feeding valve 51 provided on a rear upper part inside the shell 10 through a water feed hose 52. In addition, the detergent box 50 is connected with an upper part of the outer tank 20 through a water injection pipe 53. Tap water from a faucet is supplied into the outer tank 20 through the water feed hose 52, the detergent box 50 and the water injection pipe 53 when the water feeding valve 51 is opened. At this moment, the detergent accommodated in the detergent container 50a is supplied into the outer tank 20 along water flow.

Next, the structure of the driving unit 30 is described in details.

Figure 2:
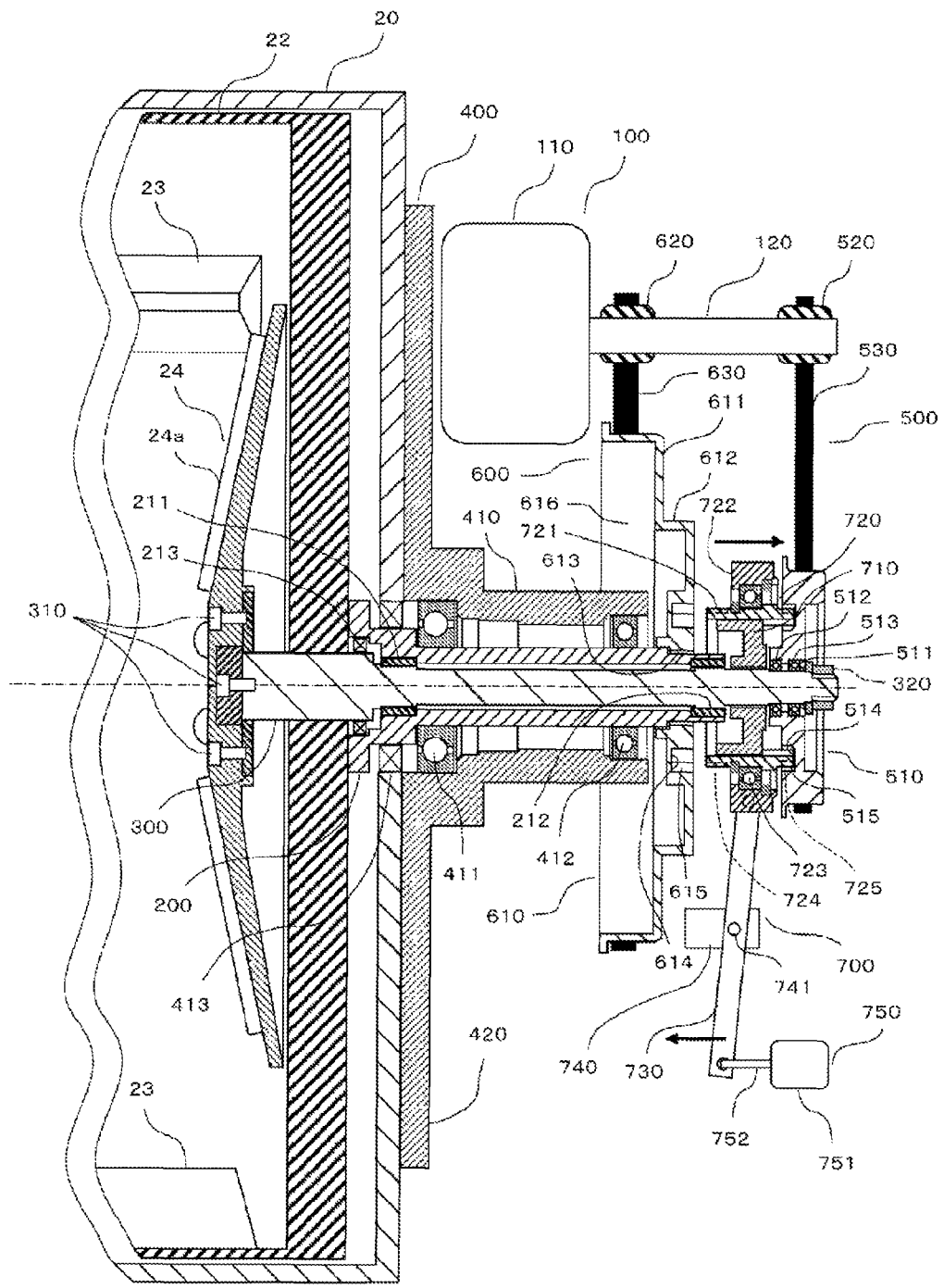
FIG. 2 is a sectional view illustrating a structure of a driving part according to embodiments.
Figure 3:
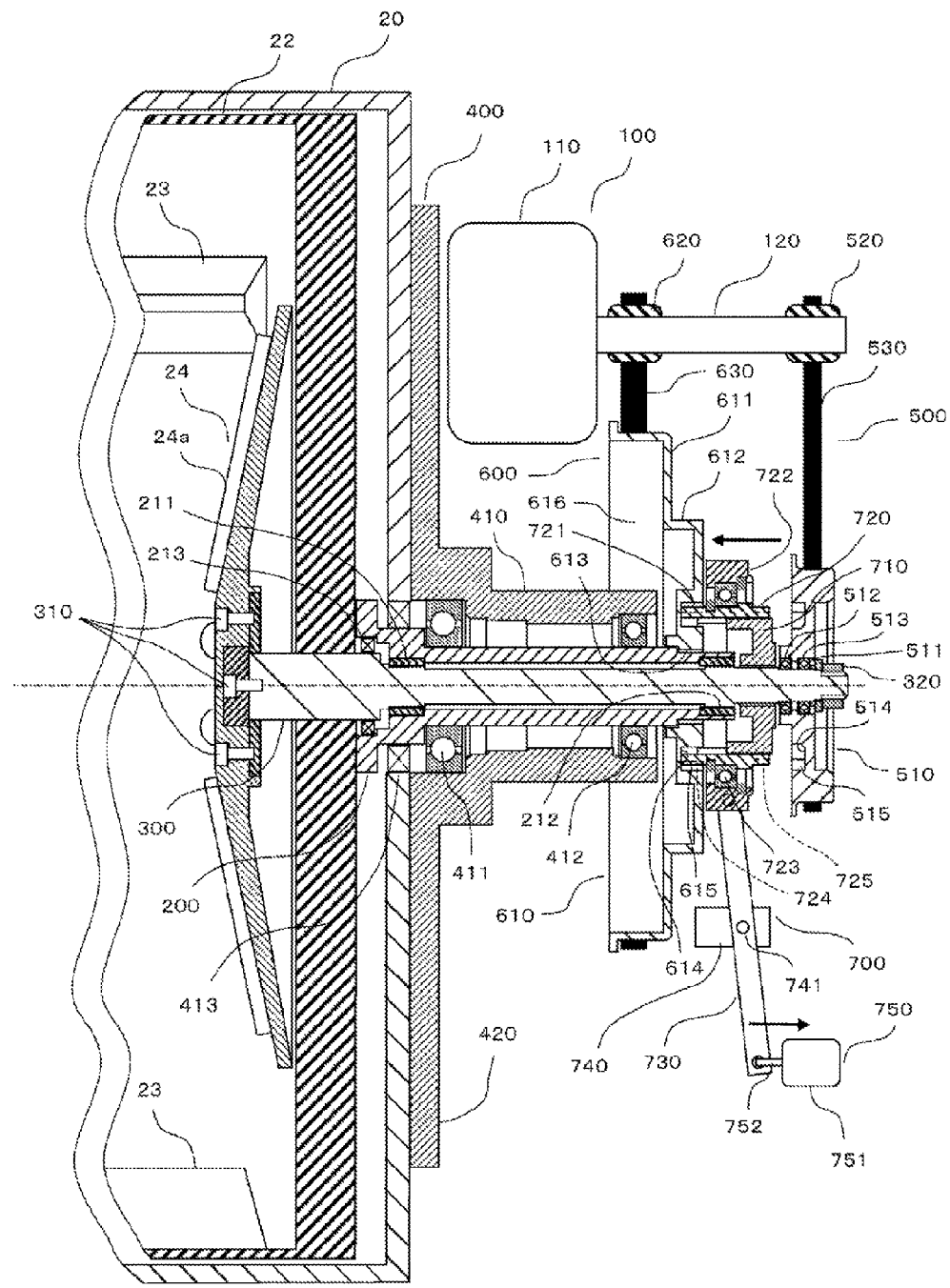
FIG. 3 is a sectional view illustrating a structure of a driving part according to embodiments.
Figure 4A:
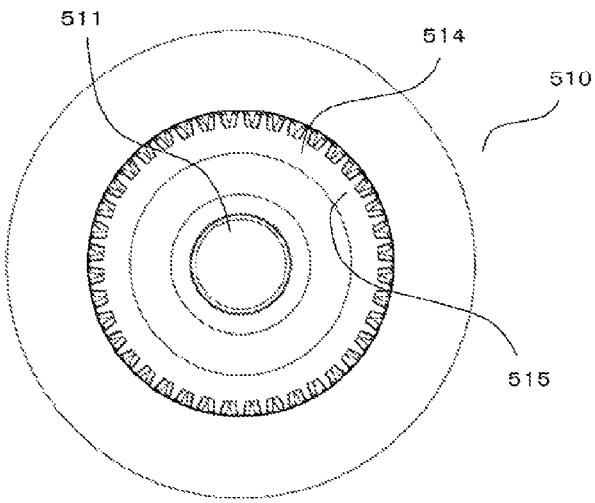
FIG. 4*a* is a diagram illustrating structures of a wing pulley and a drum pulley according to embodiments.
Figure 4B:
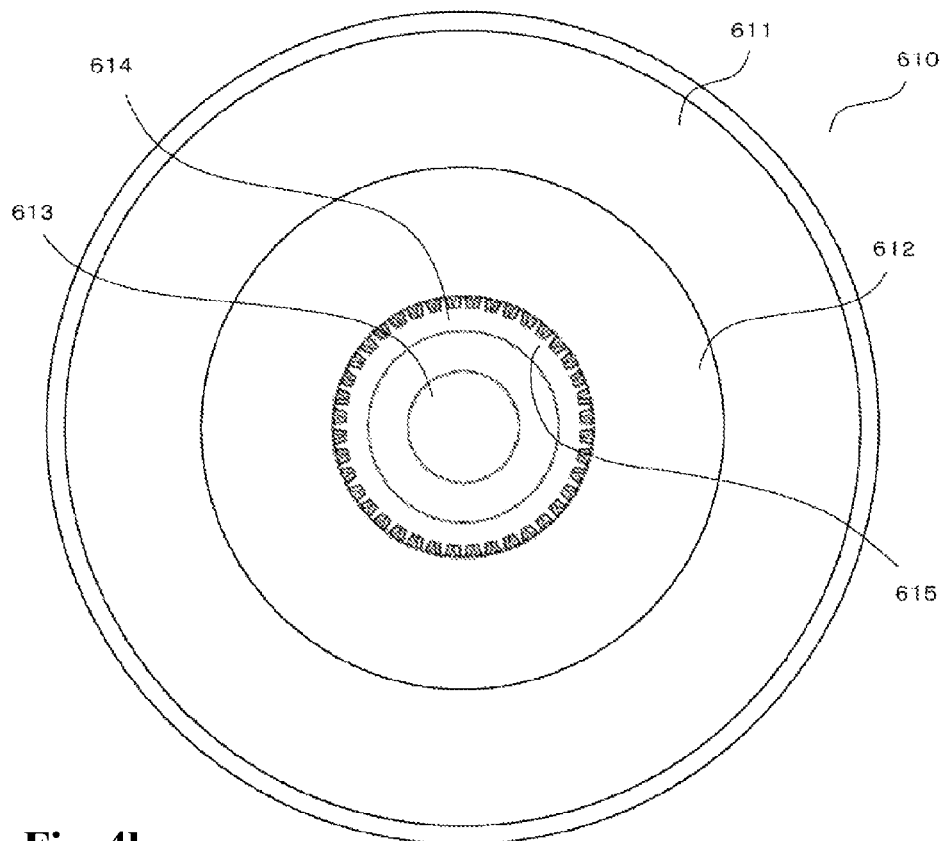
FIG. 4*b* is a diagram illustrating structures of a wing pulley and a drum pulley according to embodiments.
Figure 5B:
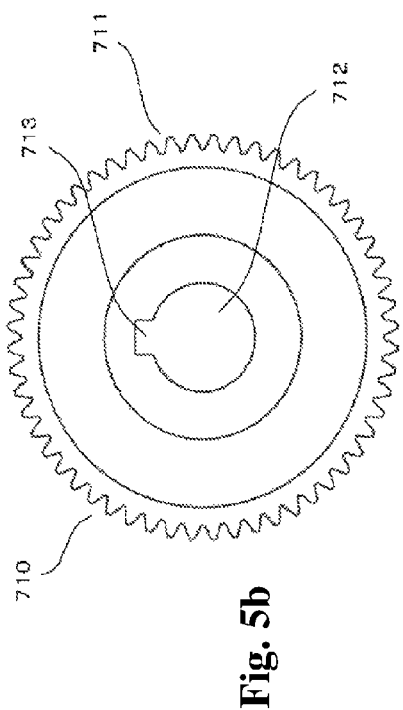
FIG. 5*b* is a diagram illustrating structures of a clutch guider and a clutch body according to embodiments.
Figure 5C:
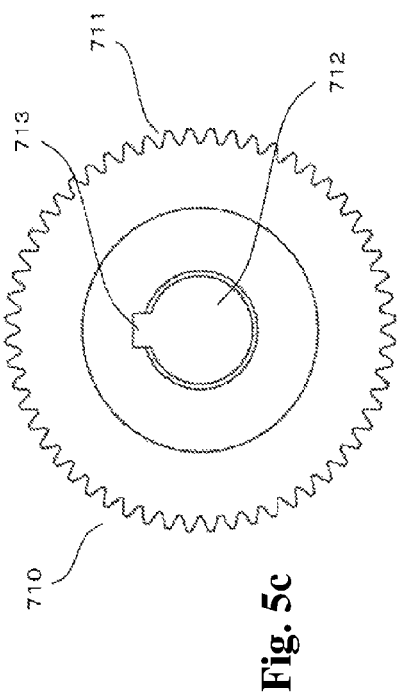
FIG. 5*c* is a diagram illustrating structures of a clutch guider and a clutch body according to embodiments.
Figure 5A:
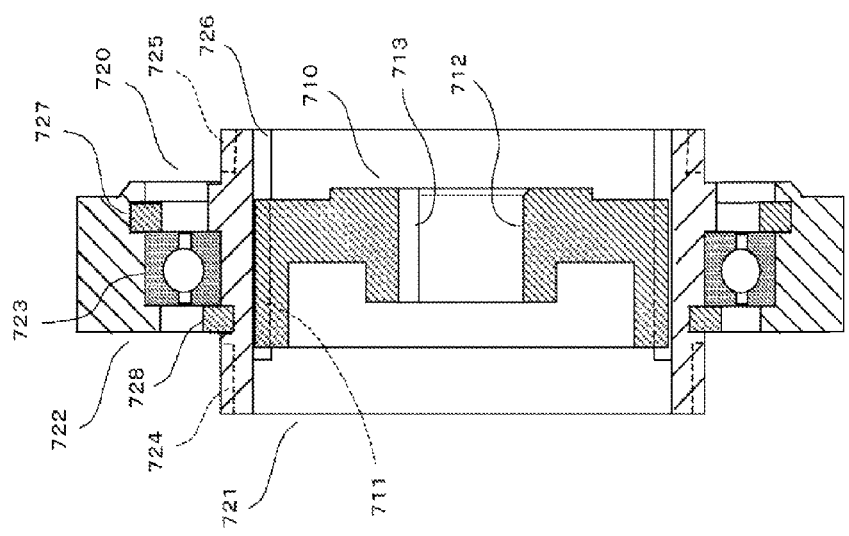
FIG. 5*a* is a diagram illustrating structures of a clutch guider and a clutch body according to embodiments.

FIG. 2 and FIG. 3 are sectional views illustrating the structure of the driving unit 30. FIG. 2 shows a state in which a driving form of the driving unit 30 is switched to a biaxial driving form, while FIG. 3 shows a state in which the driving form of the driving unit 30 is switched to a uniaxial driving form. FIGS. 4a and 4b are diagrams illustrating structures of a wing pulley 510 and a drum pulley 610. FIG. 4a is a diagram of the wing pulley 510 viewed from the front, and FIG. 4b is a diagram of the drum pulley 610 viewed from the rear. FIGS. 5a-5c are diagrams illustrating structures of a clutch guider 710 and a clutch body 720. FIG. 5a is a side sectional view of the clutch guider 710 and the clutch body 720; FIG. 5b is a diagram of the clutch guider 710 viewed from the front; FIG. 5c is a diagram of the clutch guider 710 viewed from the rear. FIGS. 6a-6c are diagrams illustrating a structure of a clutch part 721 constituting the clutch body 720; FIG. 6a is a diagram of the clutch part 721 viewed from the front; FIG. 6b is a side view of the clutch part 721; and FIG. 6c is a diagram of the clutch part 721 viewed from the rear.

The driving part 30 includes a driving motor 100, a first rotating shaft 200, a second rotating shaft 300, a bearing unit 400, a wing decelerating mechanism 500, a drum decelerating mechanism 600 and a clutch mechanism part 700.

The driving motor 100 generates torques for driving the stirring body 24 and the drum 22. The driving motor 100 is, for example, an outer rotor type direct current (DC) brushless motor. A motor shaft 120 connected with a rotor in the shell 110 extends rearward from the shell 110.

The first rotating shaft 200 is of a hollow shape. A first sliding bearing 211 and a second sliding bearing 212 are respectively at a front part and a rear part of the first rotating shaft 200, and a mechanical sealing element 213 is arranged at a front end part.

The second rotating shaft 300 is enclosed in the first rotating shaft 200. The front part of the second rotating shaft 300 protrudes forward from the first rotating shaft 200, and the rear part of the second rotating shaft 300 protrudes rearward from the first rotating shaft 200. The outer circumferential surface of the second rotating shaft 300 is supported by the first sliding bearing 211 and the second sliding bearing 212. The second rotating shaft 300 smoothly rotates within the first rotating shaft 200. In addition, the water can be prevented from entering between the second rotating shaft 300 and the first rotating shaft 200 through the mechanical sealing element 213.

A bearing part 410 with a roughly cylindrical shape is arranged in the central part of the bearing unit 400. A first rolling bearing 411 and a second rolling bearing 412 are respectively arranged on the front part and the rear part of the bearing part 410, and a mechanical sealing element 413 is arranged at the front end part. The outer circumferential surface of the first rotating shaft 200 is supported by the first rolling bearing 411 and the second rolling bearing 412. The first rotating shaft 200 smoothly rotates within the bearing part 410. In addition, the water can be prevented from entering between the first rotating shaft 200 and the bearing part 410 through the mechanical sealing element 413. Moreover, a fixed flange part 420 is formed around the bearing part 410 of the bearing unit 400.

The bearing unit 400 is fixed on the rear surface of the outer tank 20 by a fixing manner such as screw fastening and the like at the fixed flange part 420. The second rotating shaft 300 and the first rotating shaft 200 enter the interior of the outer tank 20 when the bearing unit 400 is mounted on the outer tank 20. The drum 22 is fixed to the first rotating shaft 200 by a screw not shown in figures, and the rotating body 24 is fixed to the second rotating shaft 300 by a screw 310.

The wing decelerating mechanism 500 includes a wing pulley 510, a first motor pulley 520 and a wing transmission belt 530. The rotation of the driving motor 100 is decelerated according to a deceleration ratio determined by an outer diameter ratio of the wing pulley 510 and the first motor pulley 520, and is transmitted to the second rotating shaft 300.

The wing pulley 510 is supported by a rear end part of the second rotating shaft 300 in a free rotation manner. An insertion hole 511 into which the second rotating shaft 300 is inserted is formed in the central part of the wing pulley 510, and a front and a rear rolling bearings 512 and 513 are sandwiched between the insertion hole 511 and the second rotating shaft 300. The wing pulley 510 smoothly rotates relative to the second rotating shaft 300 through the two rolling bearings 512 and 513.

As shown in FIG. 4a, an annular engaged recess part 514 is formed on a front surface of the wing pulley 510. Racks 515 are formed on the outer circumferential surface of the engaged recess part 514 throughout the entire circumference. The wing pulley 510 is prevented from falling backward through a fixing screw 320 mounted at the rear end part of the second rotating shaft 300.

The first motor pulley 520 is mounted at a front end part of the motor shaft 120 of the driving motor 100. The wing transmission belt 530 is erected between the wing pulley 510 and the first motor pulley 520.

The drum decelerating mechanism 600 includes a drum pulley 610, a second motor pulley 620 and a drum transmission belt 630. The rotation of the driving motor 100 is decelerated according to the deceleration ratio determined by an outer diameter ratio of the drum pulley 610 and the second motor pulley 620, and is transmitted to the first rotating shaft 200.

The drum pulley 610 is formed as a disc shape with an opened front surface, and includes a pulley part 611 and a fixed part 612 with an outer diameter smaller than the pulley part 611. The deceleration ratio generated by the drum decelerating mechanism 600 is greater than the deceleration ratio generated by the wing decelerating mechanism 500 since the outer diameter of the pulley part 611, i.e., the outer diameter of the drum pulley 610, is greater than the outer diameter of the wing pulley 510.

An insertion hole 613 is formed in the central part of the fixed part 612. The rear end part of the first rotating shaft 200 is inserted into the insertion hole 613 and is fixed in the insertion hole 613 by a defined fixing manner such as pressing with the racks, and the like. As a result, the drum pulley 610 is fixed at the rear end part of the first rotating shaft 200.

As shown in FIG. 4b, an annular engaged recess part 614 is formed on the rear surface of the fixed part 612 along the outer circumference of the insertion hole 613. Racks 615 are formed on the outer circumferential surface of the engaged recess part 614 throughout the entire circumference thereof.

The rear end part of the bearing part 410 is accommodated in a recess part 616, i.e., the interior of the pulley part 611, which is recessed rearward. As a result, the bearing unit 400 is overlapped with the drum pulley 610 in a front-and-back direction of the driving part 30.

The second motor pulley 620 is mounted at a root part of the motor shaft 120 of the driving motor 100. The drum transmission belt 630 is erected between the drum pulley 610 and the second motor pulley 620.

The clutch mechanism part 700 switches the driving form of the driving part 30 between the biaxial driving form and the uniaxial driving form. The biaxial driving form means the following form: the second rotating shaft 300 is connected with the wing pulley 510 so that the rotation of the wing pulley 510 can be transmitted to the second rotating shaft 300, thereby rotating the drum 22 and the rotating body 24 at mutually different rotation speeds. The uniaxial driving form means the following form: the second rotating shaft 300 is connected with the drum pulley 610 so that the rotation of the drum pulley 610 can be transmitted to the second rotating shaft 300, thereby rotating the drum 22 and the rotating body 24 at the same rotation speed. The biaxial driving form is equivalent to a first driving form of the present disclosure, and the uniaxial driving form is equivalent to a second driving form of the present disclosure.

The clutch mechanism part 700 includes a clutch guider 710, a clutch body 720, a clutch lever 730, a lever supporting part 740 and a clutch driving apparatus 750.

The clutch guider 710 and the clutch body 720 are provided between the drum pulley 610 and the wing pulley 510, which are parallel to axis directions of the first rotating shaft 200 and the second rotating shaft 300.

As shown in FIGS. 5a-5c, the clutch guider 710 is of a cylindrical shape with an opened front surface. Racks 711 are formed on the entire outer circumferential surface of the clutch guider 710 throughout the entire circumference thereof. An insertion hole 712 is formed in the central part of the clutch guider 710. The insertion hole 712 is formed with a wedge-shaped groove 713. The second rotating shaft 300 passes through the insertion hole 712 of the clutch guider 710, and the insertion hole 712 is fixed to the second rotating shaft 300 by a fixing method performed by using the wedge-shaped groove 713 and a bond not shown in the figures. As a result, the clutch guider 710 rotates together with the second rotating shaft 300.

As shown in FIG. 5a, the clutch body 720 includes a clutch part 721, a encircling part 722 and a rolling bearing 723. The clutch part 721 is of a cylindrical shape with an opened front surface and an opened rear surface. As shown in FIGS. 6a-6c, front racks 724 and rear racks 725 are respectively formed on the outer circumferential surface at the front part and the rear part of the clutch part 721 throughout the entire circumference.

An inner diameter of the clutch part 721 is roughly equal to the outer diameter of the clutch guider 710. A front-and-back dimension of the clutch part 721 is larger than the front-and-back dimension of the clutch guider 710. The clutch guider 710 is inserted into the interior of the clutch part 721. Inner racks 726 are formed on the inner circumferential surface of the clutch part 721 throughout the entire circumference. The inner racks 726 are engaged with the racks 711 of the clutch guider 710. The front-and-back dimension of the inner racks 726 is greater than the front-and-back dimension of the racks 711.

The clutch part 721 becomes the following state by the engagement of the inner racks 726 and the racks 711: the clutch part 721 can move to the axis direction of the second rotating shaft 300 relative to the clutch guider 710, i.e., the second rotating shaft 300 where the clutch guider 710 is fixed, and can rotate together with the second rotating shaft 300.

The encircling part 722 is formed in an annular shape and encircles the central part of the clutch part 721, so that the clutch part 721 can freely rotate. A rolling bearing 723 is arranged between the clutch part 721 and the encircling part 722. The rolling bearing 723 is fixed by a large and a small stop collars 727, 728 and cannot move forward and backward. The clutch part 721 smoothly rotates relative to the encircling part 722 through the rolling bearing 723.

The clutch lever 730 has an upper end part which can be connected with the encircling part 722 in a manner of rotating relative to the encircling part 722. In addition, the clutch lever 730 is supported on a fulcrum shaft 741 arranged on the level supporting part 740 in the free rotation manner.

The clutch driving apparatus 750 includes an actuator 751 and an operation lever 752. The actuator 751 enables the operation lever 752 to move forward and backward. The operation lever 752 is connected with the lower end part of the clutch lever 730. The lower end part of the clutch lever 730 can rotate relative to the operation lever 752.

The level supporting part 740 and the clutch driving apparatus 750 are fixed on a mounting plate not shown in the figures, and the mounting plate is mounted on the bearing unit 400 or the outer tank 20.

Further, the clutch lever 730, the lever supporting part 740 and the clutch driving apparatus 750 constitute a moving mechanism part for enabling the clutch body 720 to move.

As shown in FIG. 2, the operation lever 752 is pushed forward from the interior of an actuator 751 when the driving form of the driving part 30 is switched from the uniaxial driving form to the biaxial driving form. The lower end part of the clutch lever 730 is pushed and pressed by the operation lever 752 to move forward. The clutch lever 730 rotates rearward with the fulcrum shaft 741 as the center. If the upper end part of the clutch lever 730 moves rearward, the clutch body 720 is pushed and pressed by the upper end part of the clutch lever 730 to move rearward. As a result, rear racks 725 of the clutch part 721 are engaged with the racks 515 of the wing pulley 510.

When the rear racks 725 are engaged with the racks 515, since the clutch part 721 and the wing pulley 510 are fixed relative to the rotation direction, a state in which the rotation of the wing pulley 510 is transmitted to the second rotating shaft 300 via the clutch part 721 and the clutch guider 710 is formed. In this state, when the driving motor 100 is rotated, the rotation is transmitted to the second rotating shaft 300 via the wing decelerating mechanism 500, thus the rotating body 24 fixed to the second rotating shaft 300 rotates. The rotating body 24 rotates at a rotation speed decelerated from the rotation speed of the driving motor 100 according to the deceleration ratio of the wing decelerating mechanism 500. In addition, the rotation of the driving motor 100 is transmitted to the first rotating shaft 200 via the drum decelerating mechanism 600, thus the drum 22 fixed to the first rotating shaft 200 rotates. The drum 22 rotates at a rotation speed decelerated from the rotation speed of the driving motor 100 decreases according to the deceleration ratio of the drum decelerating mechanism 600. As described above, since the deceleration ratio of the drum decelerating mechanism 600 is greater than the deceleration ratio of the wing decelerating mechanism 500, the rotating body 24 rotates at a rotation speed greater than that of the drum 22 in the same direction as that of the drum 22.

Although the clutch part 721 rotates together with the wing pulley 510 herein, since the clutch lever 730 is connected with the connected encircling part 722 in a state that the clutch part 721 can rotate freely, a rotation of the clutch part 721 will not substantially transmitted to the clutch lever 730 even if the clutch part 721 rotates.

On the other hand, as shown in FIG. 3, the operation lever 752 is introduced into the actuator 751, namely the operation lever 752 moves rearward, when the driving form of the driving part 30 is switched from the biaxial driving form to the uniaxial driving form. The lower end part of the clutch lever 730 is pulled by the operation lever 752 and moved to the rear, and the clutch lever 730 rotates forward with the fulcrum shaft 741 as the center. The upper end part of the clutch lever 730 moves forward, thus the clutch body 720 is pushed and pressed by the upper end part of the clutch lever 730 to move forward. As a result, front racks 724 of the clutch part 721 are engaged with the racks 615 of the drum pulley 610.

Since the clutch part 721 and the drum pulley 610 are fixed relative to the rotation direction when the front racks 724 are engaged with the racks 615, a state in which the rotation of the drum pulley 610 can be transmitted to the second rotating shaft 300 through the clutch part 721 and the clutch guider 710 is formed. In such state, when the motor 100 rotates, the rotation is transmitted to the first rotating shaft 200 and the second rotating shaft 300 via the drum decelerating mechanism 600, so as to rotate the drum 22 and the rotating body 24. The drum 22 and the rotating body 24 integrally rotates at a rotation speed decelerated from the rotation speed of the driving motor 100 according to the deceleration ratio of the drum decelerating mechanism 600 in the same direction.

In addition, in the uniaxial driving form, when the driving motor 100 rotates, the wing pulley 510 also rotates along with the rotation. However, the wing pulley 510 only idles with respect to the second rotating shaft 300, and the rotation of the wing pulley 510 will not be transmitted to the second rotating shaft 300.

Figure 7:
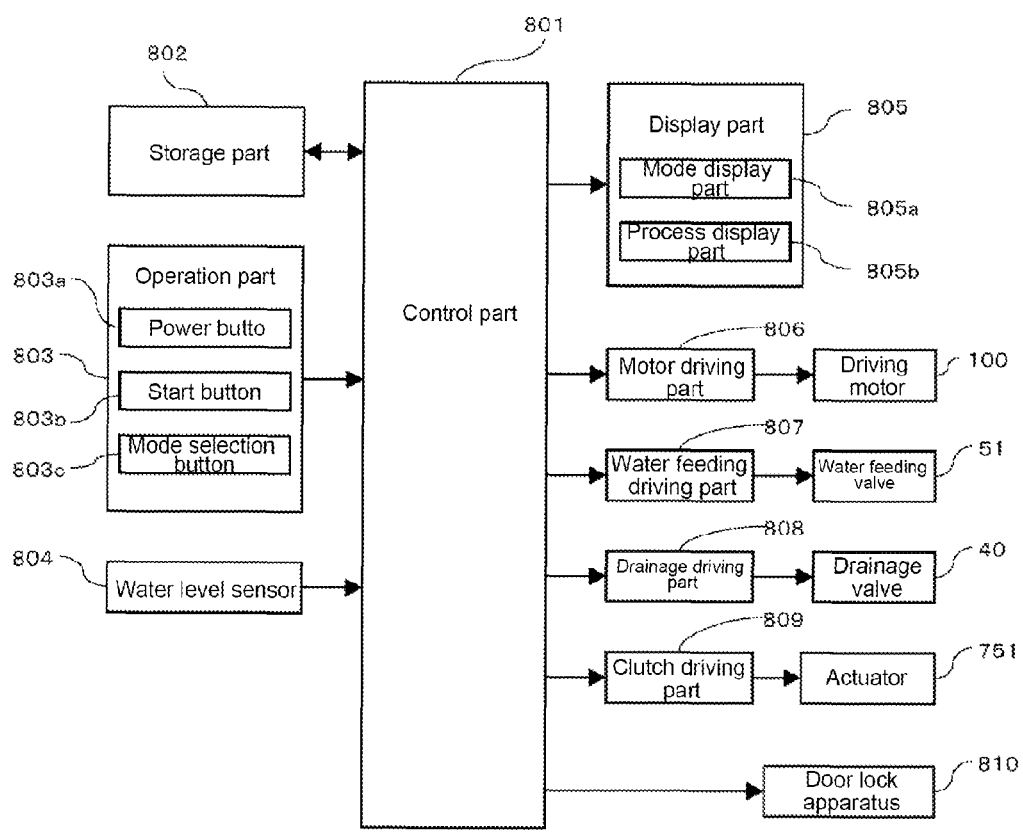
FIG. 7 is a block diagram illustrating a structure of a drum washing machine according to embodiments.

FIG. 7 is a block diagram illustrating the structure of the drum washing machine 1.

Besides the above structures, the drum washing machine 1 further includes a control part 801, a storage part 802, an operation part 803, a water level sensor 804, a display part 805, a motor driving part 806, a water feeding driving part 807, a drainage driving part 808, a clutch driving part 809 and a door lock apparatus 810.

The operation part 803 includes a power button 803*a*, a start button 803*b* and a mode selection button 803*c*. The power button 803*a* is a button for turning on and off a power supply of the drum washing machine 1. The start button 803*b* is a button for starting a washing operation. The mode selection button 803*c* is a button for selecting any washing mode from a plurality of washing modes for the washing operation. The operation part 803 is configured to output an input signal corresponding to a button operated by a user to the control part 801.

The washing mode executed by the drum washing machine 1 of the present embodiment includes at least a standard mode, a drying mark mode and a blanket washing mode. The standard mode is a washing mode for ordinary washing. The drying mark mode is a washing mode for washing sweaters, jackets, female underwear and other delicate clothes as well as school uniforms, suit pants, shirts and other clothes with drying marks. The delicate clothes and the clothes with drying marks have poor resistance to mechanical force. The blanket washing mode is a washing mode for washing blankets, quilts, bed sheets and other beddings. The drying mark mode is equivalent to the delicate mode of the present disclosure, and the blanket washing mode is equivalent to the bedding mode of the present disclosure.

The water level sensor 804 detects a water level in the outer tank 20, and outputs a water level detection signal corresponding to the detected water level to the control part 801.

The display part 805 includes a mode display part 805*a* configured to display the washing process selected via the mode selection button 803*c*, and a process display part 805*b* configured to display the ongoing process during washing operation.

The motor driving part 806 is configured to supply driving current to the driving motor 100 in accordance with a control signal from the control part 801. The motor driving part 806 includes a speed sensor for detecting the rotation speed of the driving motor 100, a frequency converter circuit and the like. The driving current is adjusted so that the driving motor 100 rotates at the rotation speed set by the control part 801.

The water feeding driving part 807 is configured to supply the driving current to the water feeding valve 51 in accordance with the control signal from the control part 801. The drainage driving part 808 is configured to supply the driving current to the drainage valve 40 in accordance with the control signal from the control part 801.

The clutch driving part 809 is configured to supply the driving current to the actuator 751 in accordance with the control signal output from the control part 801.

The door lock apparatus 810 is configured to lock and unlock a door 12 in accordance with the control signal from the control part 801.

The storage part 802 includes an electrically erasable programmable read-only memory (EEPROM), a random access memory (RAM) and the like. The storage part 802 stores modes for executing the washing operation of various washing operation modes. In addition, the storage part 802 stores various parameters and various control marks for the execution of the modes.

The control part 801 is configured to control the display part 805, the motor driving part 806, the water feeding driving part 807, the drainage driving part 808, the clutch driving part 809, the door lock apparatus 810 and the like according to the modes stored in the storage part 802 based on the signals from the operation part 803, the water level sensor 804 and the like.

The drum washing machine 1 performs the washing operation of various operation modes according to user's selection operation performed via the mode selection button 803*c*. A washing process, an intermediate dewatering process, a rinsing process and a final dewatering process are sequentially performed in the washing operation. In addition, the intermediate dewatering process and the rinsing process may be performed more than twice sometimes according to the operation mode.

In the present embodiment, in the washing process and the rinsing process, the driving form of the driving part 30 is switched between the biaxial driving form and the uniaxial driving form in accordance with the washing process, namely, the control part 801 enables the driving part 30 to operate in a driving form corresponding to the washing mode.

Figure 8:
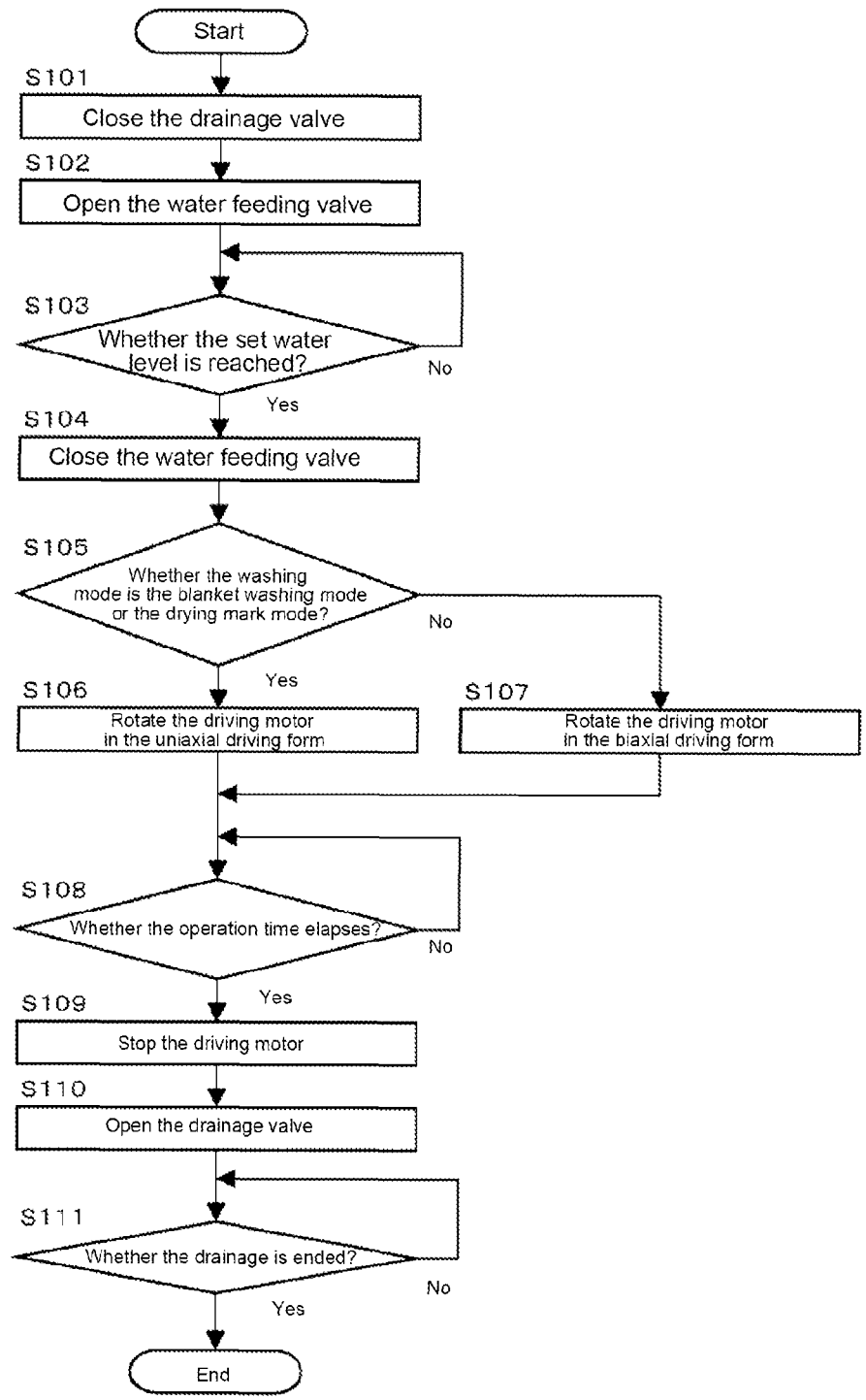
FIG. 8 is a flow chart illustrating control treatment during a washing process and a rinsing process according to embodiments.

FIG. 8 is a flow chart illustrating control treatment during the washing process and the rinsing process.

When the washing process or the rinsing process is started, the control part 801 enables the drainage valve 40 to be closed (S101), and then enables the water feeding valve 51 to be opened (S102). As a result, water is supplied to the outer tank 20. The control part 801 enables the water feeding valve 51 to be closed (S104) when a load capacity and the like corresponding to the water level detected by the water level sensor 804 reach a set water level (S103: Yes).

Next, the control part 801 determines whether the current washing mode is the blanket washing mode or the drying mark mode (S105). The control part 801 enables the driving motor 100 to rotate in the uniaxial driving form (S106) when the washing process is any one of the blanket washing mode and the drying mark mode (S105: Yes).

The driving mode of the driving part 30 at the beginning of the washing operation is set to be the uniaxial driving form. In addition, as described later, the driving form is switched to the uniaxial driving form in the intermediate dewatering process. Therefore, the control part 801 maintains the original state of the uniaxial driving form and enables the driving motor 100 to rotate in step S106 since the driving form is in a state of switching to the uniaxial driving form at the end of water feeding in the washing process or the rinsing process. The drum 22 and the rotating body 24 integrally perform a right rotation and left rotation at a rotation speed when the centrifugal force acting on the washings in the drum 22 is smaller than the gravity force.

In the case that the washing mode is the blanket washing process mode and the washing is, for example, a blanket, the blanket cannot be completely accommodated in the drum 22 and cannot be stirred by the baffles 23 due to large volume, and rotates together with the drum 22. Detergent water or rinse water stored at the bottom is infiltrated into a part of the blanket which passes through the bottom of the outer tank 20 through the rotation of the drum 22, so that the blanket is washed or rinsed. On the other hand, since the rotating body 24 does not rotate relative to the drum 22, the part of the blanket in frequent contact with the rotating body 24 will not be continuously rubbed by the rotating body 24, thereby being difficult to generate local damage to the blanket.

In the case that the washing mode is the drying mark mode and the washings are, for example, the clothes with the drying marks, the clothes with the drying marks are stirred by the baffles 23. On the other hand, since the rotating body 24 does not rotate relative to the drum 22, the clothes with the drying marks will not be rubbed and stirred by the protruding part 24a of rotating body 24 which is rotating. Therefore, an excessive application of the mechanical force to the drying mark clothes can be prevented, and the damage to the clothes with the drying marks can be prevented.

On the other hand, for example, in the case that the washing mode is the standard mode, in step S105, the control part 801 determines whether the washing mode is any one of the blanket washing mode and the drying mark mode (S105: No). In this case, the control part 801 enables the driving motor 100 to rotate in the biaxial driving form (S107). As described above, since the driving form of the driving part 30 is the uniaxial driving form at the end of water feeding, the control part 801 enables the actuator 751 to operate and enables the clutch body 720 to move, thereby switching the driving form to the biaxial driving form. Then, the control part 801 enables the driving motor 100 to rotate. The drum 22 performs the right rotation and the left rotation at the rotation speed when the centrifugal force of the washings in the drum 22 is smaller than the gravity force and a rotation speed when the rotation speed of the rotating body 24 is greater than the rotation speed of the drum 22.

The washings are stirred by the baffles 23. In addition, at the rear part of the drum 22, the washings are in contact with the protruding part 24a of the rotating body 24 which rotates relative to the drum 22 and are rubbed or stirred by the protruding part 24a. Therefore, not only the mechanical force generated by the rotation of the drum 22 but also the mechanical force generated by the rotating body 24 is given to the washings, so that the washings are firmly washed or rinsed.

In this way, the control part 801 enables the driving motor 100 to stop (S109) when a predetermined operation time elapses (S108: Yes).

Next, the control part 801 opens the drainage valve 40 (S110). As a result, the water in the outer tank 20 is drained out. The control part 801 determines whether the drainage is ended (S111). For example, after the water level in the outer tank 20 reaches a lower limit water level which can be measured by the water level sensor 804, i.e., when the predetermined time has elapsed, the control part 801 determines that the drainage is ended. When the control part 801 determines that the drainage is ended (S111: Yes), the drainage valve 40 is kept open, and the washing process or the rinsing process is finished.

The intermediate dewatering process is performed after the washing process is finished, and the final dewatering process is performed after the rinsing process is finished. However, in the case that the rinsing process is performed more than twice, the intermediate dewatering process is performed after the rinsing process other than the final rinsing process is finished.

The driving form of the driving part 30 is switched to the uniaxial driving form in the intermediate dewatering process and the final dewatering process. That is, the switching to the uniaxial driving form is performed when the biaxial driving form is adopted in the washing process or the rinsing process, and the uniaxial driving form is maintained when the uniaxial driving form is adopted.

The control part 801 enables the driving motor 100 to rotate unidirectionally at a high speed. The drum 22 and the rotating body 24 integrally rotate at a rotation speed when the centrifugal force acting on the washings in the drum 22 is greater than the gravity force. Therefore, the washings are pushed to the inner circumferential surface of the drum 22 and are dewatered by the action of the centrifugal force.

In this way, since the drum 22 and the rotating body 24 integrally rotate during dewatering, the washings adhered to the drum 22 will not be stirred by the rotating body 24, and the washings can be well dewatered.

Effects of Embodiments

According to the present embodiment, in the washing process or the rinsing process, the driving form is switched in accordance with the corresponding washing process so that the driving part 30 is operated in the biaxial driving form or the driving part 30 is operated in the uniaxial driving form. As a result, the washing can be performed in the driving forms adapted to the types of the washings, and various washings can be well washed.

Further, according to the present embodiment, the driving part 30 is operated in the uniaxial driving form in the washing process or the rinsing process of the blanket washing mode and the drying mark mode. In the uniaxial driving form, the mechanical force on the washings is increased by the rotation of the drum 22, while the mechanical force on the washings is not increased by the rotating body 24. Therefore, the blankets, bed sheets and other beddings with worries about cloth damage, as well as the delicate clothes, the clothes with the drying marks and other clothes with poor mechanical force resistance can be washed gently.

Further, according to the present embodiment, the driving part 30 is operated in the biaxial driving form in the washing process other than the blanket washing process and the drying mark process, for example, in the washing process or the rinsing process of the standard process. In the biaxial driving form, the mechanical force on the washings is increased by the drum 22 and the mechanical force on the washings is increased by the rotating body 24. Therefore, the washings with fewer worries about the cloth damage can be washed firmly.

Modification

In the above embodiment, the driving form of the driving part 30 is switched between the biaxial driving form and the uniaxial driving form. The biaxial driving form is a driving form in which the drum 22 and the rotating body 24 rotate at different rotation speeds, while the uniaxial driving form is a driving form in which the drum 22 and the rotating body 24 integrally rotate at the same rotation speed.

In contrast, in the present modification, the driving form of the driving part 30 not only can be switched to the biaxial driving form and the uniaxial driving form, but also can be switched to a drum monomer driving form in which the drum 22 is rotated and the rotating body 24 is in a state of free rotation. The drum monomer driving form is equivalent to the third driving form of the present disclosure.

Figure 9:
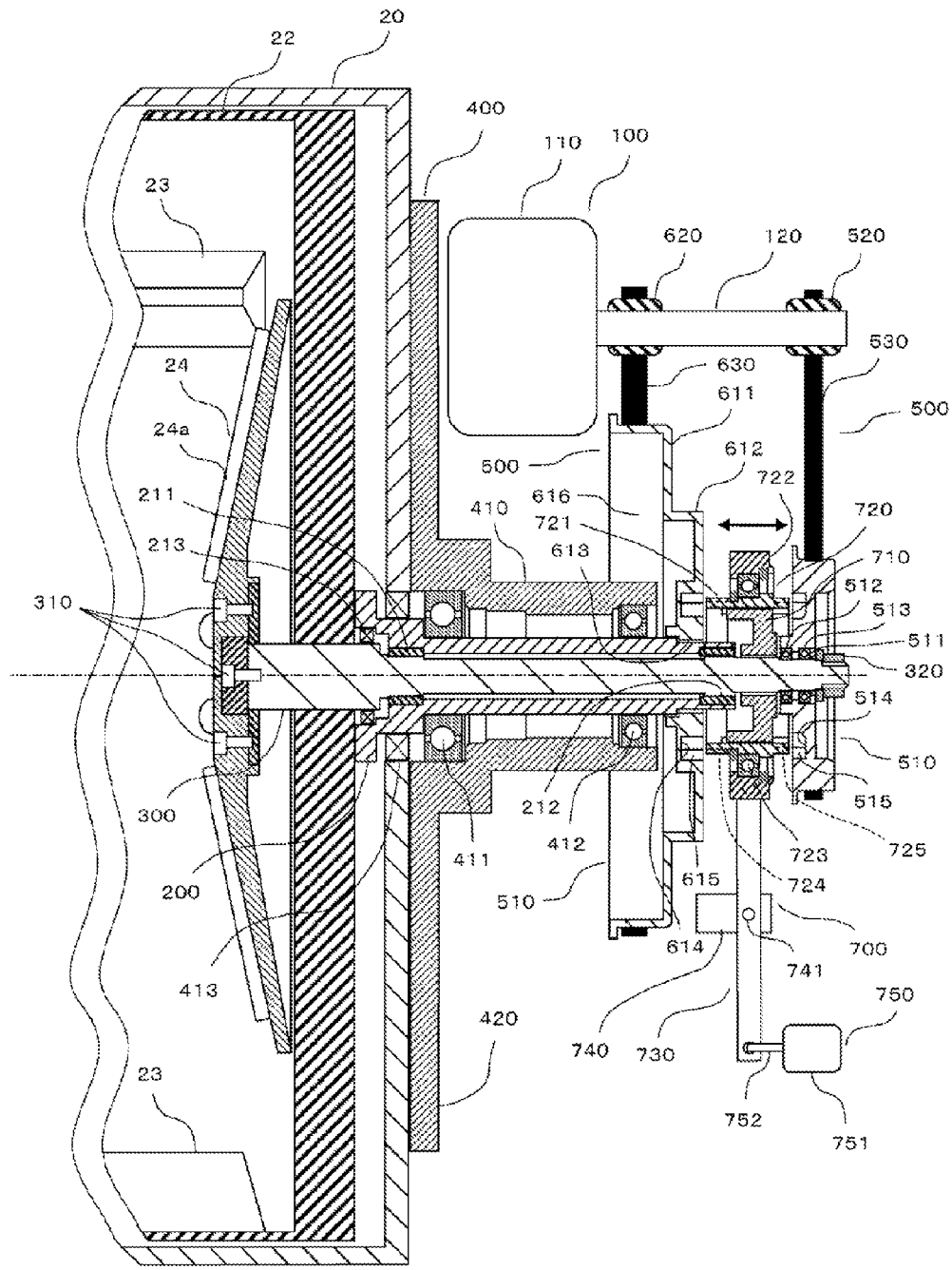
FIG. 9 is a diagram illustrating a driving unit in a state of being switched to a drum monomer driving form according to modifications.

FIG. 9 is a diagram illustrating the driving part 30 in a state of being switched to the drum monomer driving form according to the modification.

As shown in FIG. 9, in the drum monomer driving form, the front racks 724 of the clutch lever 730 are not engaged with the racks 615 of the drum pulley 610, so that the clutch part 721 moves to a position in which the rear racks 725 are also not engaged with the wing pulley 510. That is, the clutch mechanism part 700 enables the second rotating shaft 300 to be not connected with any one of the drum pulley 610 and the wing pulley 510.

In such a state, the rotating body 24 does not rotate when the driving motor 100 rotates because the rotation of any one of the pulleys 510 and 610 cannot be transmitted to the second rotating shaft 300, although the drum 22 rotates. However, since the second rotating shaft 300 can rotate relative to the first rotating shaft 200, the rotating body 24 can be in a state of free rotation.

In the washing process and the rinsing process of the modification, the driving form of the driving part 30 can be switched among the biaxial driving form, the uniaxial driving form and the drum monomer driving form in accordance with the washing process.

Figure 10:
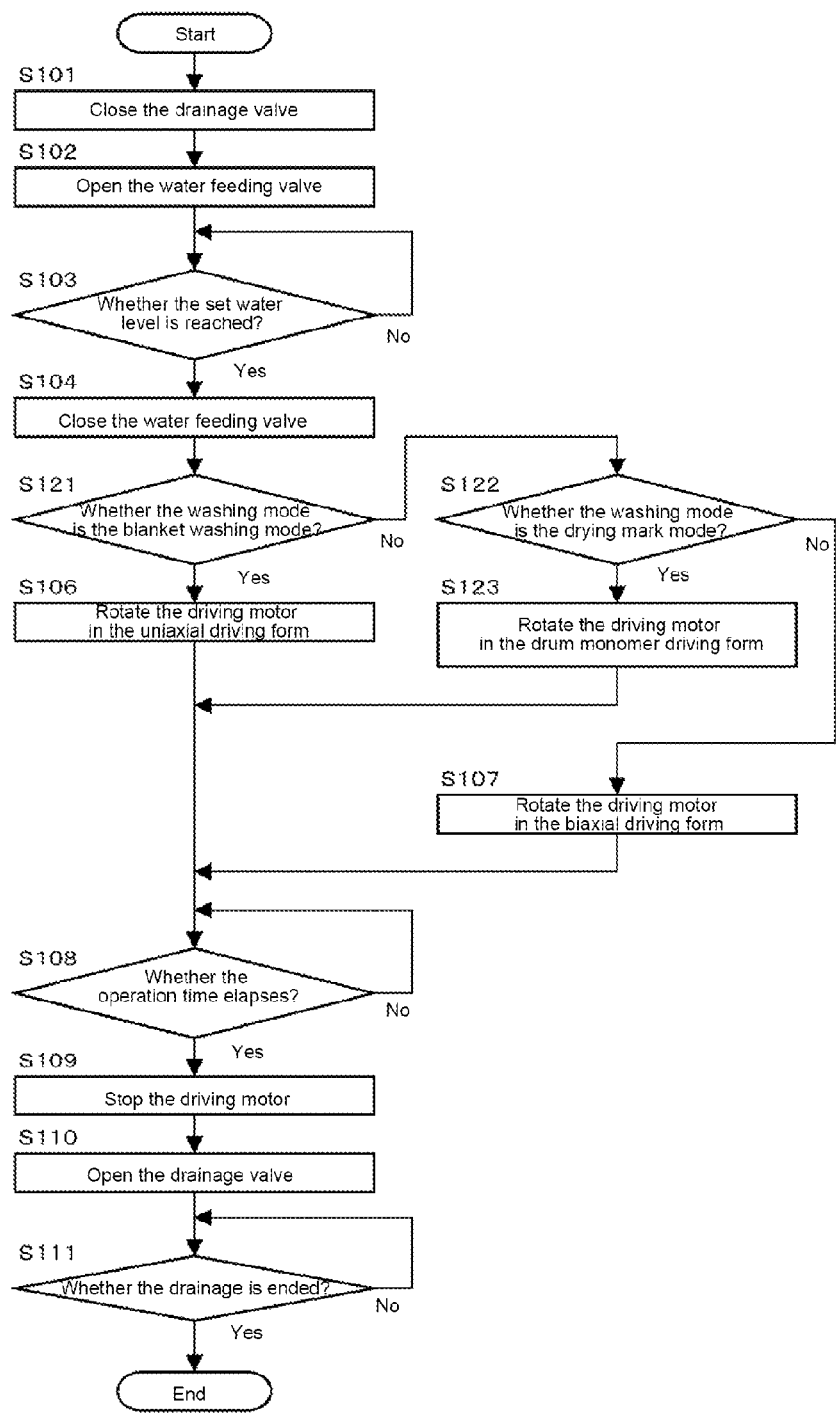
FIG. 10 is a flow chart illustrating control treatment during a washing process and a rinsing process according to modifications.

FIG. 10 is a flow chart illustrating control treatment in the washing process and the rinsing process according to the modification.

In the control treatment of FIG. 10, compared with the control treatment of FIG. 8, the treatment of step S105 is replaced with the treatments of step S121 and step S122, and the treatment of step S123 is added.

In the modification, the control part 801 determines whether the current washing process is the blanket washing process (S121) when the water feeding to the outer tank 20 is ended (S101 to S104). In addition, as described above, the driving form of the driving part 30 when the water feeding is ended is the uniaxial driving form. The control part 801 maintains the uniaxial driving form to rotate the driving motor 100 (S106) in the case that the washing process is the blanket washing process (S121: Yes). As described in the above embodiment, the blanket can be washed or rinsed in a state that the local damage can be suppressed.

On the other hand, the control part 801 determines whether the washing process is a drying mark process (S122) in the case that the washing process is not the blanket washing process (S121: No). The control part 801 enables the driving motor 100 to rotate after switching the driving form from the uniaxial driving form to the drum monomer driving form (S123) in the case that the washing process is the drying mark process (S122: Yes). The drum 22 performs the right rotation and the left rotation; and the washings are stirred by the baffles.

At the moment, on the front side of the drum 22, since the washings drop down when being lifted near a above position of the drum 22 by the baffles 23, the washings rotated approximately twice during one rotation cycle of the drum 22. On the other hand, although the washings are easily become a state of being pushed to the rotating body 24 on the rear side of the drum 22, as described above, the washings easily enables the rotating body 24 to rotate together with the washing while the washings are stirred by the baffles 23 and rotated, without action deterioration of the washings. This is because that the rotating body 24 is in a state of free rotation. Therefore, on the rear side of the drum 22, the washings are approximately rotated twice when the drum 22 rotates once, which is similar to the front side of the drum 22. Therefore, it is difficult to generate a rotation difference of the washings on the front side and the rear side of the drum 22, and it is difficult to generate a torsion of the washings through the rotation difference.

Moreover, in the case that and the rotating body 24 cannot rotate freely with respect to the drum 22, on the rear side of the drum 22, the washings do not drop down near the above position of the drum 22 when the washings are pushed by the rotating body 24 and are stirred by the baffles 23, so as to form a state in which the washings are attached to the rotating body 24 to rotate. In this way, on the rear side of the drum 22, since the washings are approximately rotated once when the drum 22 rotates once, the rotation difference of the washings is generated between the front side and the rear side of the drum 22, and the washings can be easily twisted.

In addition, in the drum monomer driving form, like the biaxial driving form, since the rotating body 24 cannot rotate by the driving motor 100, the washings will not be rubbed by the rotating body 24.

Therefore, the washings in the drying mark process, i.e., the delicate clothes and the clothes with the drying marks are washed or rinsed in a state that the damage and friction caused by torsion are difficult to be generated.

In step S122, the control part 801 enables the driving motor 100 to rotate after switching the driving form from the uniaxial driving form to the biaxial driving form (S107) when it is determined that the washing process is not the drying mark process (S122: No). The washings are washed or rinsed by a large mechanical force of both the drum 22 and the rotating body 24, as described in the above embodiment.

In this way, when the operation time elapses, the driving motor 100 is stopped, and the washing process or the rinsing process is ended after draining from the outer tank 20 (S108 to S111).

According to the modification, the driving form not only can be switched to the biaxial driving form and the uniaxial driving form, but also can be switched to the drum monomer driving form in accordance with the washing process. Therefore, various washings can be washed very well.

Further, with adoption of the modification, the driving part 30 is operated in the drum monomer driving form in the washing process or the rinsing process of the drying mark process. In the drum monomer driving form, since the washings on the rear part of the drum 22 move well through the free rotation of the rotating body 24, the torsion of the washings can be prevented by the rotation difference of the washings on the front side and the rear side of the drum 22, and the delicate clothes, the clothes with the drying marks and the clothes with poor mechanical force resistance can be washed in a state with fewer worries about cloth damage than in the uniaxial driving form.

Other Modifications

Although one embodiment of the present invention is described above, the present disclosure is not limited to the above embodiment; and embodiments of the present invention can also be subjected to various deformations in addition to the above.

For example, in the above embodiment, in the washing process or the rinsing process, the washing process is determined after the water feeding to the outer tank 20 is ended, and the driving form of the driving part 30 is switched according to a determined result. However, the determination of the washing process and the switching of the driving form can also be performed before the water feeding is started.

In addition, as the above embodiment, the determination of the washing process and the switching of the driving form are performed after the water feeding of the outer tank 20 is ended, and the drum 22 can also rotate in the uniaxial driving form during water feeding when an initial state is the uniaxial driving form. In this way, since the washings may be not pre-soaked during water feeding, the washings can be prevented from keeping a dry state and contacting with the rotating body when the drum 22 and the rotating body 24 are rotated in the biaxial driving form according to the judgment result of the washing process, thereby preventing the washings from being rubbed by unnecessary strength.

Further, in the above embodiment, the drum 22 rotates by using an inclination shaft inclining relative to the horizontal direction as the center. However, the drum 22 of the drum washing machine 1 can also be a structure which rotates by using the horizontal shaft as the center.

Further, although the drum washing machine of the above embodiment does not have the drying function, the present disclosure is also applicable to the drum washing machine with the drying function, i.e., a drum washing and drying machine.

In addition, embodiments of the present invention can be subjected to various changes within the scope of technical idea shown in the claims.

What is claimed is:

1. A drum washing machine, comprising:
an outer tank provided in a shell;
a drum, which is provided in the outer tank and configured to rotate with a horizontal shaft or an inclination shaft inclining relative to a horizontal direction as a center;
a rotating body, provided at a rear part of the drum and a surface of which is provided with a protruding part in contact with washings;
a driving part, configured to be operated in a first driving form and a second driving form, wherein the first driving form refers to a form in which the drum and the rotating body are enabled to rotate at different rotation speeds, and the second driving form refers to a form in which the drum and the rotating body are enabled to rotate integrally at a same rotation speed; and
a control part, configured to control actions of the driving part,
wherein in a washing process or a rinsing process, the control part is configured to control the driving part to be operated in the first driving form or the second driving form in accordance with a corresponding washing mode which is determined by the resistance of clothes to be washed to mechanical force;
wherein the driving part comprises a driving motor, a first rotating shaft, a second rotating shaft, a bearing unit, a wing decelerating mechanism, a drum decelerating mechanism and a clutch mechanism part;
the driving motor is further configured for driving the rotating body and the drum;
the first rotating shaft has a hollow shape, a first sliding bearing and a second sliding bearing are respectively at a front part and a rear part of the first rotating shaft, and a mechanical sealing element is arranged at a front end part;
the second rotating shaft is enclosed in the first rotating shaft, the front part of the second rotating shaft protrudes forward from the first rotating shaft, and the rear part of the second rotating shaft protrudes rearward from the first rotating shaft;
the outer circumferential surface of the second rotating shaft is supported by the first sliding bearing and the second sliding bearing, and the second rotating shaft rotates within the first rotating shaft,
a bearing part is arranged in the central part of the bearing unit, a first rolling bearing and a second rolling bearing are respectively arranged on the front part and the rear part of the bearing part, and a mechanical sealing element is arranged at the front end part, the outer circumferential surface of the first rotating shaft is supported by the first rolling bearing and the second rolling bearing, and the first rotating shaft rotates within the bearing part;
the bearing unit is fixed on the rear surface of the outer tank, the drum is fixed to the first rotating shaft, and the rotating body is fixed to the second rotating shaft;
wherein the wing decelerating mechanism comprises a wing pulley, a first motor pulley and a wing transmission belt, the wing pulley is supported by a rear end part of the second rotating shaft;
the first motor pulley is mounted at a front end part of the motor shaft of the driving motor, and the wing transmission belt is erected between the wing pulley and the first motor pulley;
the drum decelerating mechanism is configured to decelerating the first rotating shaft; and the clutch mechanism part is configured for switching the driving part between the first driving form and the second driving form.

2. The drum washing machine according to claim 1, wherein
the washing mode comprises a delicate mode for washing clothes with poor resistance to mechanical force; and
the control part is configured to control the driving part to be operated in the second driving form when the delicate mode is performed.

3. The drum washing machine according to claim 2, wherein
the washing mode comprises a bedding mode for washing beddings; and
the control part is configured to control the driving part to be operated in the second driving form when the bedding mode is performed.

4. The drum washing machine according to claim 2, wherein
the washing mode comprises a standard mode for common washing; and
the control part is configured to control the driving part to be operated in the first driving form when the standard mode is performed.

5. The drum washing machine according to claim 1, wherein
the driving part can be operated in a third driving form, wherein the third driving form refers to a form in which the drum is enabled to rotate while the rotating body is enabled to be in a free rotation state; and
in the washing process or the rinsing process, the control part is configured to switch the driving form in accordance with the corresponding washing mode, so that the driving part is operated in the first driving form, the second driving form or the third driving form.

6. The drum washing machine according to claim 5, wherein
the washing mode comprises a delicate mode for washing clothes with poor resistance to mechanical force; and
the control part is configured to control the driving part to be operated in the third driving form when the delicate mode is performed.

7. The drum washing machine according to claim 6, wherein
the washing mode comprises a bedding mode for washing beddings; and
the control part is configured to control the driving part to be operated in the second driving form when the bedding mode is performed.

8. The drum washing machine according to claim 6, wherein
the washing mode comprises a standard mode for common washing; and
the control part is configured to control the driving part to be operated in the first driving form when the standard mode is performed.

9. The drum washing machine according to claim 5, wherein
the washing mode comprises a bedding mode for washing beddings; and
the control part is configured to control the driving part to be operated in the second driving form when the bedding mode is performed.

10. The drum washing machine according to claim 5, wherein
the washing mode comprises a standard mode for common washing; and
the control part is configured to control the driving part to be operated in the first driving form when the standard mode is performed.

11. The drum washing machine according to claim 1, wherein
the washing mode comprises a bedding mode for washing beddings; and
the control part is configured to control the driving part to be operated in the second driving form when the bedding mode is performed.

12. The drum washing machine according to claim 11, wherein
the washing mode comprises a standard mode for common washing; and
the control part is configured to control the driving part to be operated in the first driving form when the standard mode is performed.

13. The drum washing machine according to claim 1, wherein
the washing mode comprises a standard mode for common washing; and
the control part is configured to control the driving part to be operated in the first driving form when the standard mode is performed.

14. The drum washing machine according to claim 1, wherein
the drum decelerating mechanism comprises a drum pulley, a second motor pulley and a drum transmission belt;
wherein the drum pulley comprises a pulley part and a fixed part with an outer diameter smaller than the pulley part;
an insertion hole is formed in the central part of the fixed part, the rear end part of the first rotating shaft is inserted into the insertion hole and is fixed in the insertion hole;
an annular engaged recess part is formed on the rear surface of the fixed part along the outer circumference of the insertion hole;
the rear end part of the bearing part is accommodated in the interior of the pulley part, which is recessed rearward;
the second motor pulley is mounted at a root part of the motor shaft of the driving motor, and the drum transmission belt is erected between the drum pulley and the second motor pulley.

15. The drum washing machine according to claim 1, wherein
the clutch mechanism part comprises a clutch guider, a clutch body, a clutch lever, a lever supporting part and a clutch driving apparatus;
wherein the clutch guider and the clutch body are provided between the drum pulley and the wing pulley, which are parallel to axis directions of the first rotating shaft and the second rotating shaft;
racks are formed on the entire outer circumferential surface of the clutch guider throughout the entire circumference; an insertion hole is formed in the central part of the clutch guider; the insertion hole is formed with a wedge-shaped groove; the second rotating shaft passes through the insertion hole of the clutch guider, and the insertion hole is fixed to the second rotating shaft;
the clutch body comprises a clutch part, a encircling part and a rolling bearing, front racks and rear racks are respectively formed on the outer circumferential surface at the front part and the rear part of the clutch part throughout the entire circumference;

the clutch guider is inserted into the interior of the clutch part, inner racks are formed on the inner circumferential surface of the clutch part throughout the entire circumference, the inner racks are engaged with the racks of the clutch guider; the front-and-back dimension of the inner racks is greater than the front-and-back dimension of the racks;

the encircling part encircles the central part of the clutch part;

the clutch lever has an upper end part which can be connected with the encircling part in a manner of rotating relative to the encircling part, and the clutch lever is supported on a fulcrum shaft arranged on the level supporting part in the free rotation manner;

the clutch driving apparatus comprises an actuator and an operation lever; the actuator enables the operation lever to move forward and backward, the operation lever is connected with the lower end part of the clutch lever, and the lower end part of the clutch lever can rotate relative to the operation lever.

\* \* \* \* \*